(12) United States Patent
Willett et al.

(10) Patent No.: US 9,478,216 B2
(45) Date of Patent: Oct. 25, 2016

(54) GUEST SPEAKER ROBUST ADAPTED SPEECH RECOGNITION

(75) Inventors: Daniel Willett, Walluf (DE); Lambert Mathias, Medford, MA (US); Chuang He, Westford, MA (US); Jianxiong Wu, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 212 days.

(21) Appl. No.: 13/514,458

(22) PCT Filed: Dec. 8, 2009

(86) PCT No.: PCT/US2009/067055
§ 371 (c)(1),
(2), (4) Date: Jun. 8, 2012

(87) PCT Pub. No.: WO2011/071484
PCT Pub. Date: Jun. 16, 2011

(65) Prior Publication Data
US 2012/0245940 A1 Sep. 27, 2012

(51) Int. Cl.
*G10L 15/00* (2013.01)
*G10L 15/07* (2013.01)
*G10L 15/32* (2013.01)

(52) U.S. Cl.
CPC .............. *G10L 15/07* (2013.01); *G10L 15/32* (2013.01)

(58) Field of Classification Search
USPC .......................... 704/244, 246, 247, 251, 252
See application file for complete search history.

(56) References Cited

U.S. PATENT DOCUMENTS

| | | | |
|---|---|---|---|
| 5,864,810 A | 1/1999 | Digalakis et al. | |
| 5,960,397 A * | 9/1999 | Rahim | 704/244 |
| 6,073,096 A | 6/2000 | Gao et al. | |
| 6,292,779 B1 * | 9/2001 | Wilson et al. | 704/257 |
| 6,442,519 B1 | 8/2002 | Kanevsyk et al. | |
| 7,502,737 B2 * | 3/2009 | Sharma | 704/251 |
| 8,843,370 B2 * | 9/2014 | Willett et al. | 704/243 |
| 2001/0011218 A1 * | 8/2001 | Phillips et al. | 704/256 |
| 2002/0095287 A1 | 7/2002 | Botterweck | |

(Continued)

FOREIGN PATENT DOCUMENTS

| | | |
|---|---|---|
| EP | 1394770 A1 | 3/2004 |
| EP | 1548705 A1 | 6/2005 |
| WO | 9918566 A2 | 4/1999 |

OTHER PUBLICATIONS

International Search Report for International Application No. PCT/US2009067055 mailed Aug. 17, 2010.

(Continued)

*Primary Examiner* — Leonard Saint Cyr
(74) *Attorney, Agent, or Firm* — Banner & Witcoff, Ltd.

(57) ABSTRACT

A method for speech recognition is implemented in the specific form of computer processes that function in a computer processor. That is, one or more computer processes: process a speech input to produce a sequence of representative speech vectors and perform multiple recognition passes to determine a recognition output corresponding to the speech input. At least one generic recognition pass is based on a generic speech recognition arrangement using generic modeling of a broad general class of input speech. And at least one adapted recognition pass is based on a speech adapted arrangement using pre-adapted modeling of a specific sub-class of the general class of input speech.

27 Claims, 2 Drawing Sheets

(56) References Cited

U.S. PATENT DOCUMENTS

| | | |
|---|---|---|
| 2002/0143540 A1 | 10/2002 | Malayath et al. |
| 2004/0186819 A1* | 9/2004 | Baker .................. G10L 15/22 |
| 2007/0192101 A1 | 8/2007 | Braho et al. |
| 2008/0077386 A1* | 3/2008 | Gao et al. ...................... 704/3 |
| 2008/0120091 A1* | 5/2008 | Waibel .................. G06F 17/289 |
| | | 704/2 |
| 2008/0201136 A1* | 8/2008 | Fujimura et al. ............ 704/201 |
| 2009/0030552 A1* | 1/2009 | Nakadai et al. .............. 700/258 |
| 2009/0030685 A1* | 1/2009 | Cerra et al. ................... 704/236 |
| 2009/0030687 A1* | 1/2009 | Cerra et al. ................... 704/243 |
| 2009/0030688 A1* | 1/2009 | Cerra et al. ................... 704/243 |
| 2009/0030691 A1* | 1/2009 | Cerra et al. ................... 704/255 |
| 2009/0030697 A1* | 1/2009 | Cerra et al. ................... 704/275 |
| 2009/0138265 A1* | 5/2009 | Willett et al. ................. 704/251 |
| 2010/0094628 A1* | 4/2010 | Bacchiani et al. ........... 704/235 |
| 2010/0312557 A1* | 12/2010 | Strom et al. .................. 704/246 |
| 2011/0004462 A1* | 1/2011 | Houghton et al. ............... 704/9 |
| 2011/0295590 A1 | 12/2011 | Lloyd et al. |

OTHER PUBLICATIONS

International Preliminary Report on Patentability for International Application No. PCT/US2009067055 mailed Jun. 12, 2012.

Wang et al. "MPE-Based Discriminative Liner Transforms for Speaker Adaptation." Computer Speech & Language, vol. 22, Issue 3. Jul. 2008. pp. 256-272.

* cited by examiner

GUEST SPEAKER ROBUST ADAPTED SPEECH RECOGNITION

FIELD OF THE INVENTION

The invention generally relates to computer processor implemented systems for automatic speech recognition (ASR), and more specifically to adaptation of ASR systems.

BACKGROUND ART

An automatic speech recognition (ASR) system tries to determine a representative meaning (e.g., text) corresponding to input speech. Typically, the input speech is processed into a sequence of digital frames. Each frame can be thought of as a multi-dimensional vector that represents various characteristics of the speech signal present during a short time window of the speech. In a continuous recognition system, variable numbers of frames are organized as "utterances" representing a period of speech followed by a pause which in real life loosely corresponds to a spoken sentence or phrase.

The system compares the input utterances to find acoustic models that best match the vector sequence characteristics and determines corresponding representative text associated with the acoustic models. Modern acoustic models typically use state sequence models such as Hidden Markov Models that model speech sounds (usually phonemes) using mixtures of probability distribution functions, typically Gaussians. Phoneme models often represent phonemes in specific contexts, referred to as context-dependent phonemes, e.g. triphones or phonemes with known left and/or right contexts.

State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Some ASR arrangements are generic to a broad class of multiple speakers and input channels (e.g. microphone type) and acoustic environments, which is referred to as speaker independent (SI) and channel/environment independent speech recognition. Such systems can be specialized to a specific speaker, speaker group, speaking style, channel or environment by means of adaptation. For example, an SI arrangement can be adapted for a specific individual speaker to create a speaker dependent (SD) arrangement. Typically, the acoustic model component of the recognizer is adapted, but some language model adaptation techniques also have been proposed and successfully deployed.

It is well known, however, that the performance of an adapted speech recognizer degrades whenever there is a mismatch between the adaptation data (speaker, speaker group, channel, speaking style, acoustic environment) that the recognizer has been adapted to and the input speech data that it actually faces in application. An adapted SD recognizer, for example, strongly degrades in performance when being applied on a different speaker than the one it was adapted to.

In many speech recognition applications such as mobile handset ASR or server-based speech recognition, a speaker often cannot be correctly identified. Still, the applications usually do have a main or prime user and adaptation of the application to the prime user is desirable to improve recognition accuracy. Hence, an adapted system should have some means of achieving only minor degradation for general speakers ("guest speakers") despite the adaptation to the prime user.

SUMMARY OF THE INVENTION

Embodiments of the present invention are directed to a method for speech recognition which is implemented in the specific form of computer processes that function in a computer processor. That is, one or more computer processes: process a speech input to produce a sequence of representative speech vectors and perform multiple recognition passes to determine a recognition output corresponding to the speech input. At least one generic recognition pass is based on a generic speech recognition arrangement using generic modeling of a broad general class of input speech. And at least one adapted recognition pass is based on a speech adapted arrangement using pre-adapted modeling of a specific sub-class of the general class of input speech.

In further specific embodiments, the generic recognition pass and the adapted recognition pass may be performed in parallel. Or, the generic recognition pass and the adapted recognition pass may be performed in series. In the latter case, the adapted recognition pass may be performed before the generic recognition pass or vice versa. And the output of the first recognition pass may be a confusion network of recognition hypotheses, or a lattice or N-best list of recognition hypotheses that the following pass re-evaluates. The generic recognition pass may use speaker independent recognition and the adapted recognition pass may use speaker dependent recognition. The final recognition result may be the result of the last recognition pass in the series; it may also be a system combination result incorporating results from intermediate passes.

In specific embodiments, the specific sub-class may be a specific prime user of the speech recognition method such that the adapted recognition pass uses speaker dependent recognition and the generic recognition pass uses speaker independent recognition. Or the specific sub-class may be a specific speaker group, a specific speaking style, or a specific speech channel. In some embodiments, the speech adapted arrangement may be based on adapted feature transforms so that the multiple recognition passes may use the same acoustic models.

Embodiments of the present invention also include a speech recognition engine implemented as a computer processes in a computer processor and using a method according to any of the arrangements described above. And embodiments also include a computer program product implemented in a computer readable storage medium for speech recognition which includes program code for performing a method according to any of the arrangements described above.

DETAILED DESCRIPTION OF SPECIFIC EMBODIMENTS

Various embodiments of the present invention are directed to techniques for the combined application of adapted and un-adapted speech recognition arrangements to improve recognition performance for guest speakers using a speaker adapted recognition arrangement adapted for another main user. More broadly, this can be thought of as improving recognition performance for a broad general class of input speech in a recognizer that is pre-adapted to a specific sub-class of the general class. In specific embodiments, the specific sub-class may be a specific prime user of the speech recognition method such that the adapted recognition pass uses speaker dependent recognition and the generic recognition pass uses speaker independent recognition. Or the specific sub-class may be a specific speaker group, a specific speaking style, or a specific speech channel.

Figure 1:
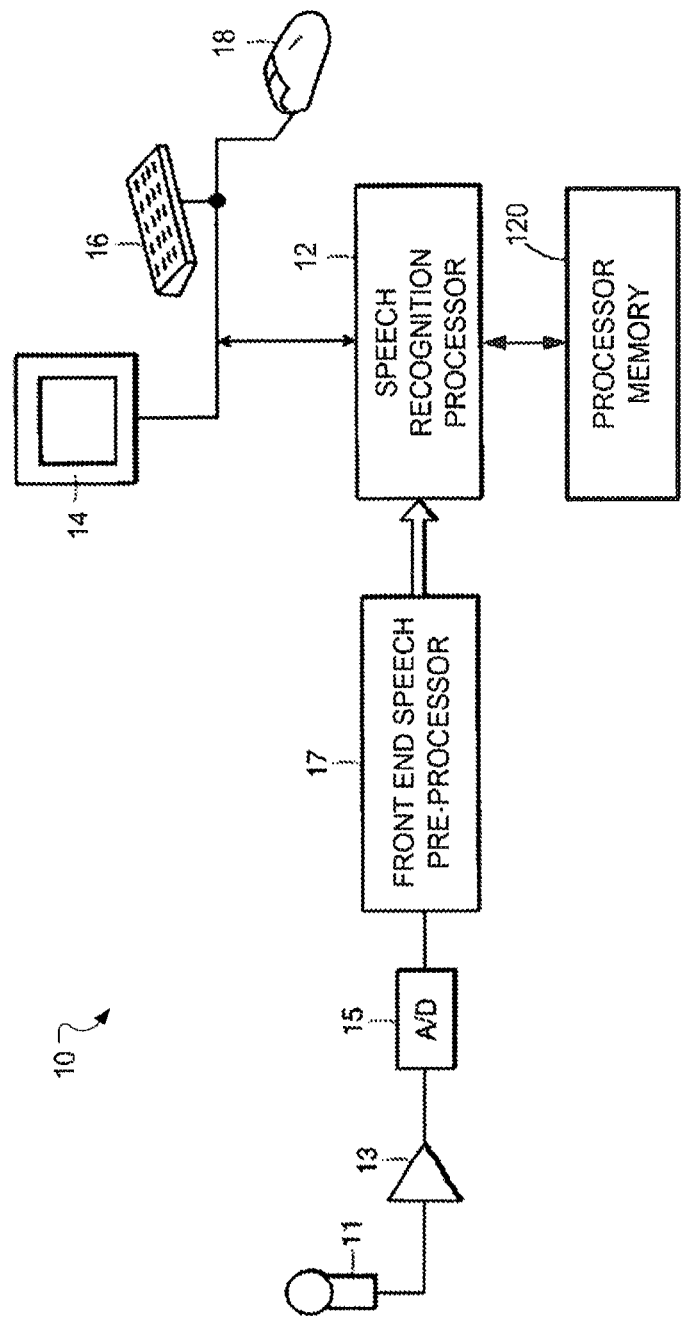
FIG. 1 is a block diagram representing various hardware components of an embodiment of a speech recognition system according to the present invention.

FIG. 1 shows various hardware components of an embodiment of an ASR system according to the present invention. A computer system 10 includes a speech input microphone 11 which is connected through a suitable pre-amplifier 13 to an analog-to-digital (A/D) converter 15. A front-end speech pre-processor 17 typically performs a Fourier transform so as to extract spectral features to characterize the input speech as a sequence of representative multi-dimensional vectors. A speech recognition processor 12, e.g., an Intel Core 2 processor or the like, is programmed to run one or more specialized computer software processes to determine a recognition output corresponding to the speech input. To that end, processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10. Of course, many other typical arrangements are also familiar such as an ASR implemented for a mobile device such as a cell phone, ASR for the cabin of an automobile, client-server based ASR, etc.

According to embodiments of the present invention, a method for speech recognition is implemented in the specific form of computer processes that function in a computer processing environment such as described in the preceding paragraph. Specifically, one or more computer processes operate in an ASR system to process a speech input to produce a sequence of representative speech vectors. Multiple recognition passes are performed on the vector sequence to determine a recognition output that corresponds to the speech input. Of these multiple recognition passes, at least one generic recognition pass is based on a generic speech recognition arrangement using generic modeling of a broad general class of input speech. And at least one adapted recognition pass is based on a speech adapted arrangement using pre-adapted modeling of a specific sub-class of the general class of input speech. Altogether, the multi-pass recognition arrangement provides a speech recognition system that is pre-adapted for improved recognition performance for a specific prime or main user, while having only minor degradation for general speakers ("guest speakers") despite the adaptation to the prime user.

Figure 2:
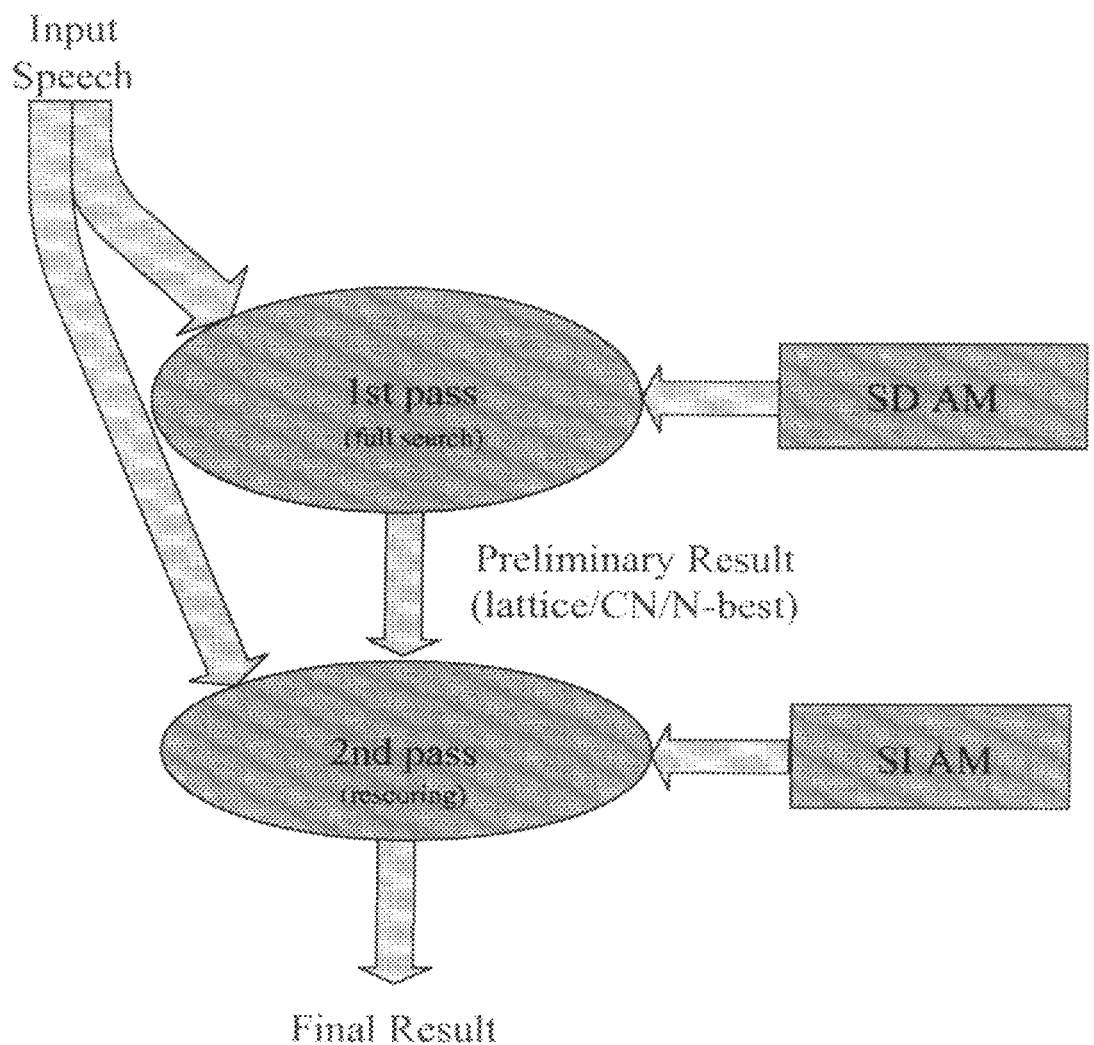
FIG. 2 shows functional blocks in a series multi-pass recognition arrangement according to one specific embodiment of the present invention.

FIG. 2 shows an example of a specific series multi-pass recognition arrangement where a first recognition pass is initially performed on the speech input using of pre-adapted speaker dependent (SD) acoustic models to produce intermediate results of recognition hypotheses. For example, these recognition hypotheses may be in the specific form of a confusion network, a recognition lattice, or an N-best list. Then a second recognition pass is performed to rescore the intermediate recognition hypotheses using unadapted generic speaker independent (SI) acoustic models to produce the final recognition result. A pseudo code representation of such an embodiment might be set forth as follows:

Process MultipassHybridAdaptedRecognition
    convert speech input to sequence of representative speech vectors,
    first recognition pass with pre-adapted speaker dependent (SD) acoustic models to produce intermediate recognition results,
    second recognition pass with un-adapted speaker dependent (SI) acoustic models to produce intermediate recognition results.

In such an arrangement, subsequent recognition passes can use the output of the previous pass for adaptation and/or constraining the search space. In some embodiments, the recognition passes may partially use a speaker-independent (SI) configuration and partially a speaker-dependent (SD) configuration. Or, some embodiments may select between SI and SD configurations based on model matching criteria.

The re-scoring pass can improve the final recognition result for many different reasons. It is possible to apply different, higher resolution acoustic models than in the first pass (e.g., a selected gender-dependent model, higher dimensional feature space, etc.). In some embodiments, the speech adapted SD arrangement may be based on adapted feature transforms so that the multiple recognition passes may use the same acoustic models. For example, batch-mode feature- and channel-normalization schemes may be used such as batch-mode Channel (or Cepstral) Mean/Variance Normalization (CMN/CVN), batch-mode spectral subtraction, and other mean and variance normalization schemes. Also, first and second pass model complementariness contributes to improving the final recognition result.

Of course, there are various different ways to construct an adapted arrangement. An SD recognition system can be initially constructed and adapted from the start to a specific speaker. Or an arrangement that starts with SI models can be adapted to become SD models based on either off-line or on-line adaptation over time. And either batch or incremental adaptation techniques may be applicable. Some experiments were performed where it was found that applying a pre-adapted SD acoustic model in the first pass and an SI acoustic model configuration in the second pass yielded a favorable trade-off between adaptation gain for the prime speaker while preserving acceptable performance for guest speakers.

In other specific embodiments, the generic recognition pass and the adapted recognition pass may be performed in parallel rather than in series. With parallel decoding using an SI and an SD arrangement, the decoding searches can be mutually pruned or results can be combined by means of system combination such as ROVER (Recognizer Output Voting for Error Reduction), see e.g., J. G. Fiscus, *A Post-Processing System To Yield Reduced Word Error Rates: Recognizer Output Voting Error Reduction(ROVER)*, In Proc. ASRU, pages 347-354, 1997; incorporated herein by reference, or CNC (Confusion Network Combination), see. e.g., G. Evermann and P. Woodland, *Posterior Probability*

*Decoding, Confidence Estimation And System Combination*, In Proc. NIST Speech Transcription Workshop, 2000; incorporated herein by reference.

Embodiments of the present invention also include a speech recognition engine implemented as a computer processes in a computer processor and using a method according to any of the arrangements described above. And embodiments also include a computer program product implemented in a computer readable storage medium for speech recognition which includes program code for performing a method according to any of the arrangements described above.

Embodiments of the invention may be implemented using any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for speech recognition implemented as a plurality of computer processes functioning in a computer processor, the method comprising:

in one or more computer processes:
processing a speech input to produce a sequence of representative speech vectors; and
performing a first recognition pass using a first acoustic model to produce at least one intermediate recognition hypothesis corresponding to the speech input;
performing a second recognition pass using a second acoustic model to re-evaluate the at least one intermediate recognition hypothesis and produce a final recognition result corresponding to the speech input; and
wherein the second recognition pass is a generic recognition pass that is based on a generic speech recognition arrangement using generic acoustic modeling of a broad general class of input speech; and
wherein the first recognition pass is an adapted recognition pass that is based on a speech adapted arrangement using pre-adapted acoustic modeling of a specific sub-class of the general class of input speech.

2. A method according to claim 1, wherein the specific sub-class is a specific prime user of the method for speech recognition such that the adapted recognition pass uses a speaker dependent acoustic model and the generic recognition pass uses a speaker independent acoustic model.

3. A method according to claim 1, wherein the specific sub-class is a specific speaker group.

4. A method according to claim 1, wherein the specific sub-class is a specific speaking style.

5. A method according to claim 1, wherein the specific sub-class is a specific speech channel.

6. A method according to claim 1, wherein the speech adapted arrangement is based on adapted feature transforms and the first and second recognition passes use the same acoustic models.

7. The method according to claim 1, wherein the first recognition pass occurs prior to the second recognition pass.

8. A device comprising memory storing instructions that, when executed by a computer processor of the device, cause the device to perform a method of speech recognition comprising:

processing a speech input to produce a sequence of representative speech vectors; and
performing a first recognition pass using a first acoustic model to produce at least one intermediate recognition hypothesis corresponding to the speech input;
performing a second recognition pass using a second acoustic model to re-evaluate the at least one intermediate recognition hypothesis and produce a final recognition result corresponding to the speech input; and
wherein the second recognition pass is a generic recognition pass that is based on a generic speech recognition arrangement using generic acoustic modeling of a broad general class of input speech; and
wherein the first recognition pass is an adapted recognition pass that is based on a speech adapted arrangement using pre-adapted acoustic modeling of a specific sub-class of the general class of input speech.

9. The device according to claim 8 wherein the specific sub-class is a specific prime user of the method of speech recognition such that the adapted recognition pass uses a speaker dependent acoustic model and the generic recognition pass uses a speaker independent acoustic model.

10. The device according to claim 8 wherein the specific sub-class is a specific speaker group.

11. The device according to claim 8 wherein the specific sub-class is a specific speaking style.

12. The device according to claim 8 wherein the specific sub-class is a specific speech channel.

13. The device according to claim 8 wherein the speech adapted arrangement is based on adapted feature transforms and the first and second recognition passes use the same acoustic models.

14. The device according to claim 8, wherein the at least one intermediate recognition hypothesis comprises a confusion network of one or more recognition hypotheses that is re-evaluated during the second recognition pass.

15. The device according to claim 8, wherein the at least one intermediate recognition hypothesis comprises a lattice or N-best list of one or more recognition hypotheses that is re-evaluated during the second recognition pass.

16. The method according to claim 8, wherein the first recognition pass occurs prior to the second recognition pass.

17. A non-transitory computer-readable storage medium comprising instructions that, when executed by a computer processor of a device, cause the device to perform a method of speech recognition comprising:
processing a speech input to produce a sequence of representative speech vectors; and
performing a first recognition pass using a first acoustic model to produce at least one intermediate recognition hypothesis corresponding to the speech input;
performing a second recognition pass using a second acoustic model to re-evaluate the at least one intermediate recognition hypothesis and produce a final recognition result corresponding to the speech input; and
wherein the second recognition pass is a generic recognition pass that is based on a generic speech recognition arrangement using generic acoustic modeling of a broad general class of input speech and
wherein the first recognition pass is an adapted recognition pass that is based on a speech adapted arrangement using pre-adapted acoustic modeling of a specific sub-class of the general class of input speech.

18. The computer-readable storage medium according to claim 17 wherein the specific sub-class is a specific prime user of the method of speech recognition such that the adapted recognition pass uses a speaker dependent acoustic model and the generic recognition pass uses a speaker independent acoustic model.

19. The computer-readable storage medium according to claim 17 wherein the specific sub-class is a specific speaker group.

20. The computer-readable storage medium according to claim 17 wherein the specific sub-class is a specific speaking style.

21. The computer-readable storage medium according to claim 17 wherein the specific sub-class is a specific speech channel.

22. The computer-readable storage medium according to claim 17 wherein the speech adapted arrangement is based on adapted feature transforms and the first and second recognition passes use the same acoustic models.

23. The method according to claim 1, wherein the at least one intermediate recognition hypothesis comprises a confusion network of one or more recognition hypotheses that is re-evaluated during the second recognition pass.

24. The method according to claim 1, wherein the at least one intermediate recognition hypothesis comprises a lattice or N-best list of one or more recognition hypotheses that is re-evaluated during the second recognition pass.

25. The computer-readable storage medium according to claim 17, wherein the at least one intermediate recognition hypothesis comprises a confusion network of one or more recognition hypotheses that is re-evaluated during the second recognition pass.

26. The computer-readable storage medium according to claim 17, wherein the at least one intermediate recognition hypothesis comprises a lattice or N-best list of one or more recognition hypotheses that is re-evaluated during the second recognition pass.

27. The method according to claim 17, wherein the first recognition pass occurs prior to the second recognition pass.

* * * * *